United States Patent [19]
Gautheron et al.

[11] Patent Number: 6,122,044
[45] Date of Patent: Sep. 19, 2000

[54] PROCESS FOR LOCATING BY REFLECTOMETRY A FAULT ON AN OPTICAL TRANSMISSION LINK AND LOCATION DEVICE APPLYING SUCH PROCESS

[75] Inventors: Olivier Gautheron, Voisin le Bretonneux; Vincent Letellier, Paris, both of France

[73] Assignee: Alcatel, Paris, France

[21] Appl. No.: 09/099,949

[22] Filed: Jun. 19, 1998

[30] Foreign Application Priority Data

Jun. 19, 1997 [FR] France .................................. 97 07631

[51] Int. Cl.[7] .................................................. G01N 21/00
[52] U.S. Cl. ............................................ 356/73.1; 385/24
[58] Field of Search .................................. 356/73.1, 345; 385/24, 45, 12, 13; 250/227.15, 227.14

[56] References Cited

U.S. PATENT DOCUMENTS 5,500,733  3/1996  Boisrobert et al. ..................... 356/345

OTHER PUBLICATIONS

S. Furukawa et al, "Enhanced Coherent OTDR for Long Span Optical Transmission Lines Containing Optical Fiber Amplifiers", IEEE Photonics Technology Letters, vol. 7, No. 5, May 1, 1995, pp. 540–542.

M. Sumida et al, "High–Accurate Fault Location Technology Using FSK–ASK Probe Backscattering Reflectometry in Optical Amplifier Submarine Transmission Systems", Journal of Lightwave Technology, vol. 14, No. 1, Oct. 1996, pp. 2108–2116.

"Fault Detection and Isolation in Optical Transmission Systems Using Optical Amplifiers", IBM Technical Disclosure Builletin, vol. 38, No. 5, May 1, 1995, pp. 59–61.

*Primary Examiner*—Robert H. Kim
*Assistant Examiner*—Tu T. Nguyen
*Attorney, Agent, or Firm*—Sughrue, Mion, Zinn, Macpeak & Seas, PLLC

[57] ABSTRACT

A process for locating a fault on an optical transmission link using a coherent detection reflectometer at a terminal sends over the transmission link measuring pulses and a loading signal interleaved between the measuring pulses. The loading signal is chosen to have the same optical wavelength as the measuring pulses with which it is combined and an extended bandwidth such that the power that it develops in the narrow measuring band of the reflectometer is negligible compared to that developed by the measuring pulses.

7 Claims, 2 Drawing Sheets

PROCESS FOR LOCATING BY REFLECTOMETRY A FAULT ON AN OPTICAL TRANSMISSION LINK AND LOCATION DEVICE APPLYING SUCH PROCESS

BACKGROUND OF THE INVENTION

1. Field of the Invention

The invention concerns a process for locating a fault on an optical transmission link using a coherent detection reflectometer in a terminal of the link. It also concerns fault location devices using this process.

2. Description of the Prior Art

Correct operation of wavelength division multiplex optical transmission networks requires it to be possible to test the essential components of such networks that the transmission links constitute.

This is particularly important if the links are amplified, as it must then be possible to assure that signals are transmitted correctly regardless of the wavelength concerned in the range of wavelengths used, given that a fault at a link amplifier can have different effects according to the wavelengths of the signals transmitted.

One prior art solution to the problem of verifying the correct operation of an optical transmission link consists in placing a coherent detection reflectometer in a terminal through which the link is able to receive at least one optical signal of particular wavelength in order, on the one hand, to send measuring pulses having a particular duration and a particular repetition rate over the link and, on the other hand, to locate any fault on the basis of the reflectometry signal obtained by means of a heterodyne receiver of the reflectometer. A loading signal at a wavelength different from that of the measuring pulses is conventionally associated with the measuring pulses to maintain a constant power level in the transmission link, when the latter is amplified, and consequently to maintain the quality of the reflectometry signal.

A solution of this kind cannot be used if filtering is employed, for example at the level of a network connection unit, to extract a signal of particular wavelength in order to transmit it via a branch link to a particular branch terminal. The loading signal is not diverted to the terminal with the measuring pulses between which is it interleaved.

SUMMARY OF THE INVENTION

The invention therefore proposes a process for locating a fault on an optical transmission link using a coherent detection reflectometer at a terminal and adapted to send over the transmission link measuring pulses and a loading signal which is combined with the measuring pulses, the optical loading signal having the same wavelength as the measuring pulses with which it is combined and an extended bandwidth so that the power that it develops in the narrow measuring band of the reflectometer is negligible.

The invention also proposes a device for locating a fault on an optical transmission link, in particular a branch of an optical network in which the signals transmitted are spectrally multiplexed, including a coherent detection reflectometer utilizing the loading process defined hereinabove to produce an optical loading signal having the same wavelength as the measuring pulses that the reflectometer generates and with which the loading signal is combined and an extended bandwidth chosen so that the power developed by the loading signal in the narrow measuring band used by the reflectometer is negligible.

Other features and advantages of the invention will become apparent from the description of certain embodiments of the invention given with reference to the accompanying drawings.

DETAILED DESCRIPTION OF THE PREFERRED EMBODIMENTS

Figure 1:
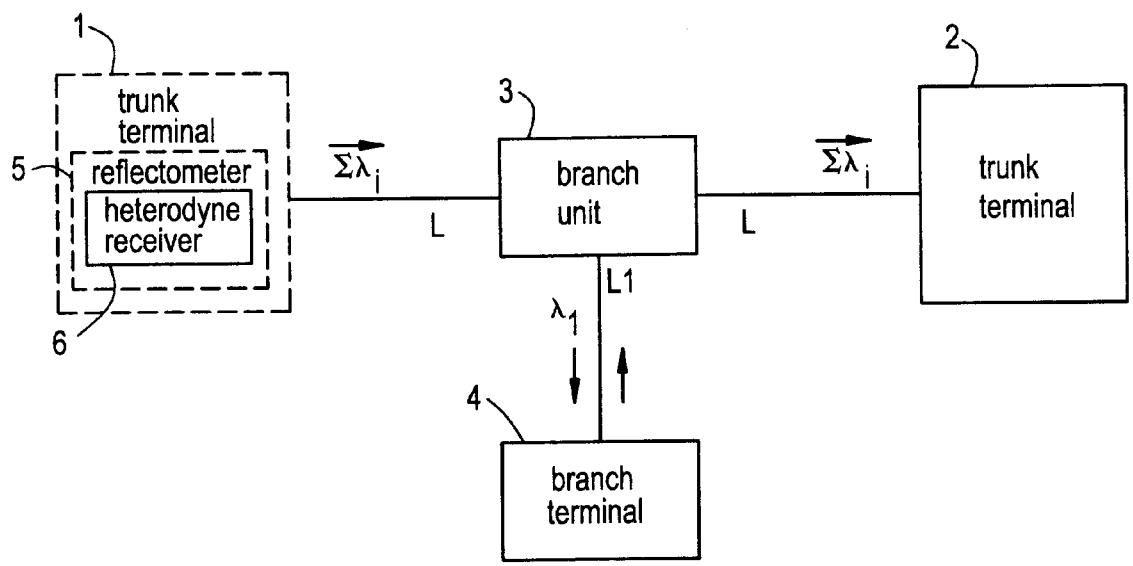
FIG. 1 shows a block schematic relating to an optical transmission network to which the invention more particularly applies.

The optical transmission network subsystem of a communication system shown in FIG. 1 includes an optical transmission line L installed between two trunk terminals 1 and 2 of a wavelength-division multiplex optical transmission network.

A branch unit 3 is incorporated into the link L between the two trunk terminals for extracting one or more wavelengths among those that can be sent by one of the trunk terminals over the link L, this sending terminal being assumed here to be the trunk terminal 1.

In the example envisaged here it is assumed that the branch unit 3 can extract a modulated optical carrier signal at a particular wavelength, for example $\lambda_1$, for the benefit of a branch terminal 4 from all the wavelengths $\Sigma\lambda_i$ that can be sent by the sending trunk terminal 1 over the link L. It is assumed that this extraction is performed by selective filtering, for example by means of a Bragg grating that transmits only the signal of wavelength $\lambda_1$ to the branch terminal 4 via the optical link L1 connecting the latter to the branch unit 3, if such is the choice made.

Figure 2:
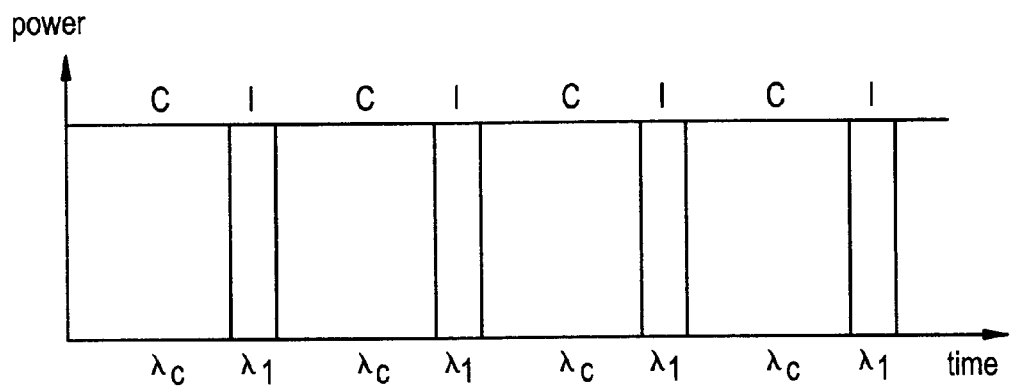
FIG. 2 is an emission schematic for a reflectometer as conventionally employed.

One known way to verify the correct operation of the optical link L is to place a coherent detection reflectometer 5 at the sending trunk terminal 1 to cause it to send over the link L measuring pulses I of short duration, for example in the order of 30 microseconds, at a given wavelength with a repetition rate chosen according to the length of the link. A loading signal C, the wavelength $\lambda_c$ of which is different to that of the wavelengths used to transmit information via the link L, is interleaved between the successive pulses, as shown in FIG. 2, to maintain a constant power level in the link L, here assumed to be amplified by means of at least one optical amplifier, not shown. The objective of this is to obtain a response signal of sufficient quality at a heterodyne receiver 6 included in the reflectometer 5. If a branch unit 3 diverting only the signal at wavelength $\lambda_1$ is inserted in the link L, it can transmit only measuring pulses sent at this wavelength by the reflectometer 5, and not the loading signal, via the link L1 to the branch terminal 4 that it serves. It is then not possible to search for a fault on the link L1 from the trunk terminal 1.

Figure 3:
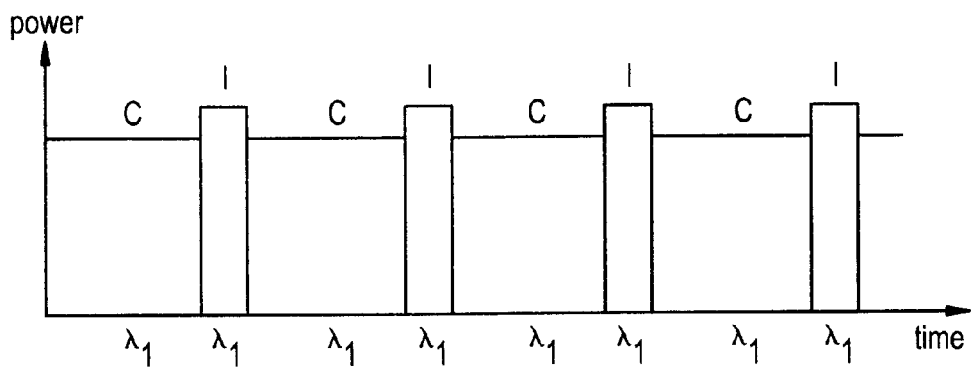
FIG. 3 shows an emission schematic for a reflectometer as used in the process of the invention.

In accordance with the invention, given that the electrical bandwidth of the heterodyne receiver 6 included in the reflectometer 5 is narrow, for example in the order of 30 kHz for the 30 microsecond pulses referred to above, it is feasible to use a loading signal C at the same wavelength as the measuring pulses, for example the wavelength $\lambda_1$ as shown in FIG. 3. This loading signal is intended to maintain a mean optical power level on the link to prevent excessive variations.

If the loading signal C has sufficient bandwidth, for example more than 100 MHz, the quantity of power that it generates in the 30 kHz measuring band of the heterodyne receiver 6 is very small and can be neglected in that it has no real influence on the results of the measurements effected by the reflectometer 5 on the basis of the pulses that it sends.

If, as envisaged above, a branch unit 3 is incorporated in the link L to divert to a branch terminal the signal at wavelength $\lambda_1$ from the sending trunk terminal 1 it is possible to verify the portion of the link L between the trunk terminal 1 and the branch unit 3 as well as the link L1 connecting this branch unit to the branch terminal 4. It is then possible to locate a fault by means of the reflectometer 5 and in a manner conventional in the field on the basis of measuring pulses I at wavelength $\lambda_1$ between which is interleaved a loading signal C at the same wavelength, because these pulses and this signal pass through the branch unit in both transmission directions. Location by this means and the means of implementing it are described for example in the article "Enhanced Coherent OTDR for Long Span Optical Transmission Lines Containing Optical Fiber Amplifiers" published by S. FURUKAWA et al. in volume 7 number 5, of IEEE PHOTOTONICS TECHNOLOGY LETTERS, May 1995.

Figure 4:
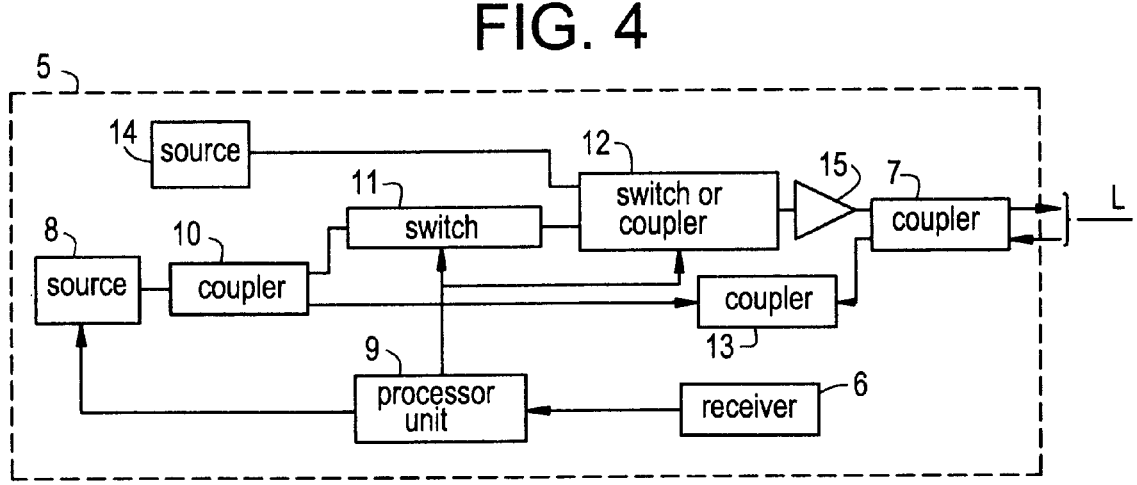
FIG. 4 shows a block schematic of a location device in accordance with the invention.

One example of a location device is schematically represented in FIG. 4 and is assumed to be primarily constituted of a coherent detection reflectometer 5 coupled to a link L by a branch send-receive optical coupler 7. The latter has an output port enabling it to send an optical measuring signal via the link L and from the trunk terminal 1 in which this reflectometer is assumed to be located. It also enables it to receive the return optical measuring signal after successive transmission in one direction, as indicated above, and then in the other direction after reflection. This reflection occurs at the trunk terminal 3 at the other end of the link L, for example, or at a branch terminal 4 connected to the link L by a branch unit 3 at an intermediate point on the link L. The reflectometer 5 conventionally includes a source 8 capable of producing an optical signal of particular wavelength chosen in the range of wavelengths that can be used by the optical link L which as previously indicated is of the WDM (Wavelength Division Multiplex) type. The wavelength supplied by the source 8 is here assumed to be fixed by means of a processor unit 9 of the reflectometer enabling the source to be controlled to obtain from it a signal at a particular wavelength in the range of wavelengths used, for example in the range 1.545 $\mu$m to 1.565 $\mu$m. This optical signal of particular wavelength is transmitted via an optical coupler 10 to a pulse generator 11 and to another optical coupler 13 at the input of the heterodyne receiver of the reflectometer.

As is usual in the field, the processor unit 9 is assumed to be based on one or possibly more processors, for example a control processor and a signal processor, and includes dedicated interfaces, memories and clock, these components not being shown here.

The pulse generator 11 is an acousto-optic switch, for example, and it is assumed to be supervised by the processor unit 9. From the signal received from the source 8 it generates measuring pulses at wavelength $\lambda_1$ having a particular duration and a particular repetition rate depending as previously stated on the length of the link monitored. It therefore assures a very small frequency shift of the pulse signal that it produces relative to the signal that it receives from the source 8 to create the frequency offset needed for the heterodyne receiver 6 of the reflectometer to function.

The measuring pulses produced by the pulse generator 11 are transmitted to an input of a unit 12 another input of which receives the loading signal C supplied by an optical source 14. The loading signal C is generated in a manner that is known in itself to have exactly the same wavelength as the measuring pulses and an extended bandwidth chosen so that the power that it develops is negligible in the narrow measuring band used by the reflectometer 5.

The unit 12 is an optical switch, for example, controlled by the processor unit 9 and its output carries a composite optical signal in which the loading signal C is interleaved between the measuring pulses of which it is substituted in time intervals during which these pulses are not sent.

Alternatively, the unit 12 can be of the coupler type, in which case it receives in exactly the same way the measuring pulses at wavelength $\lambda_1$ from the pulse generator 11 via one input and the optical loading signal C at the same wavelength $\lambda_1$ from the optical source 14 via another input. In contrast, the signal at the output of the coupler unit 12 consists of the superposed measuring pulses at wavelength $\lambda_1$ and loading signal at the same wavelength.

In any event, the optical signal which appears at the output of the unit 12 chosen is transmitted to the branch coupler 7, conventionally via at least one optical amplifier 15, in order to be sent over the link L.

It is known that, following such transmission, the signal reflected by the link over which the measuring pulses and the loading signal travel is oriented by the branch coupler 7 towards the coupler 13 where it is mixed with the signal at wavelength $\lambda_1$ from the source via the couple 10. The optical signal obtained at the output of the coupler 13 is transmitted to the heterodyne receiver 6 of the reflectometer in a manner that is known in the art. This receiver supplies an electrical signal to the processor unit 9 which provides the fault location information through the intermediary of man-machine interface means, for example of the screen or printer type, as is known in the art.

Of course, faults can be located using the loading process described above wavelength by wavelengths for all of the range used for transmission from a given trunk terminal over an optical transmission link to which the terminal is connected for purposes of transmission.

Figure 5:
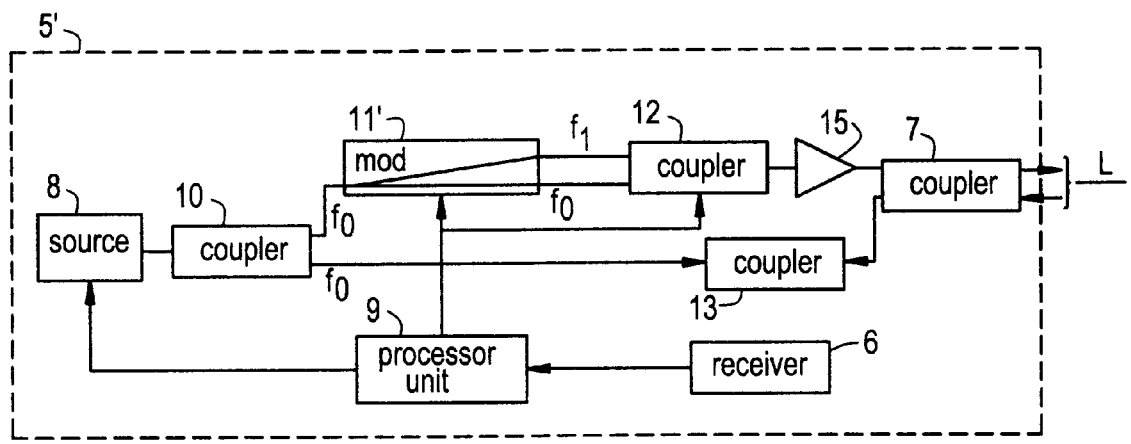
FIG. 5 shows a block schematic of a variant location device of the invention.

A monosource variant is schematically represented in FIG. 5, some of its component parts, in particular the components 6 through 10, 13 and 15, corresponding to those shown in FIG. 4.

As previously, the source 8 produces an optical signal at a particular wavelength that is assumed to be fixed by the processor unit 9 of the reflectometer. This optical signal is oriented towards an optical coupler 10 which sends it to an acousto-optical modulator 11' and to the optical coupler 13 where the optical signal is mixed with the return optical signals after transmission and reflection, as previously.

The acousto-optical modulator 11' is monitored by the processor unit 9 and generates measuring pulses of particular duration with a given repetition rate, as previously indicated.

The application of an electrical voltage to the acousto-optical modulator 11' causes a spatial deflection and a shift in the frequency of the optical signal coming from the source 8 via the coupler 10. In this way it is possible to recover the optical signal at frequency $f_0$ at the output of the modulator 11' on the axis of the fiber on which the signal arrived, in the absence of the deflection voltage, and, alternatively, when the deflection voltage is applied, an optical signal of frequency $f_1$ via a fiber angularly offset in space, in a specific manner relative to the common alignment axis defined hereinabove. The optical signal at frequency $f_1$ is offset 100 MHz relative to the optical signal at frequency $f_0$, for example, and is chopped into short measuring pulses by application of an appropriate deflection voltage. The optical signal at frequency $f_0$ appearing at the output of the modulator in the absence of measuring pulses is used as a loading signal. The measuring pulses and the loading signal are separately transmitted to a coupler type unit 12 for transmission to the branch coupler 7 which extracts them to the link L provided that the frequency shift is not prohibitive, and in particular subject to the hypothesis explained in the above example. A solution of this kind has the advantage of requiring adjustment of only one source when a change or wavelength is rendered necessary for reasons of measuring link branches involving different wavelengths.

What is claimed is:

1. A process for locating a fault on an optical transmission link comprising the steps of;

transmitting an optical signal from a coherent detection reflectometer onto said optical transmission link, said optical signal comprising a plurality of measuring pulses and a loading signal combined therewith and where said loading signal and said measuring pulses have the same optical wavelength and said measuring pulses have a relatively large power in a limited measuring bandwidth and said loading signal has a relatively low power in said limited measuring bandwidth, detecting, in said limited measuring bandwidth, a reflected signal returned to said coherent detection reflectometer, and determining a fault location as a function of the detected signal.

2. A process according to claim 1 wherein said loading signal is combined with said measuring signals by superposing said pulses and said loading signal.

3. A process according to claim 1 wherein said loading signal is combined with said measuring pulses by interleaving said loading signal between said measuring pulses.

4. A fault locating device comprising;

a coherent detection reflectometer transmitting a plurality of measuring pulses and a loading signal combined therewith wherein said loading signal has the same optical wavelength as the measuring pulses and an extended bandwidth such that the power developed by said loading signal in a narrow measuring band used by said coherent detection reflectometer is negligible.

5. A device according to claim 4 wherein said coherent detection reflectometer comprises a source supplying an optical signal at a given wavelength that can be varied to an acousto-optical modulator to which is applied an electrical control voltage enabling it alternatively to transmit via a first output said optical signal supplied by said source, in the absence of any electrical control voltage, and via a second output spatially offset relative to said first output an optical signal the frequency of which is shifted, when said electrical voltage is applied, the duration of the phases of presence and of absence of said control voltage being chosen so that said optical signal at the shifted frequency corresponds to a sequence of measuring pulses and the non-shifted signal corresponds to a signal that can be used as a loading signal, these two signals being transmitted to an input of a branch coupler connected to a transmission link, the frequency offset between modulator output signals being chosen in the range of frequency offsets appropriate to the heterodyne receiver of said reflectometer.

6. A device according to claim 4 wherein said coherent detection reflectometer comprises an optical coupler type unit enabling it to superpose said loading signal at a given wavelength that it receives via a first input and said measuring pulses at the same wavelength that it receives via a second input and to transmit the optical signal obtained for purposes of transmission over an optical link to be tested.

7. A device according to claim 4 wherein said coherent detection reflectometer comprises a commanded optical switch type unit for interleaving said loading signal at a given wavelength received via a first input between said pulses at the same wavelength received via a second input and transmitting the optical signal over an optical link.

* * * * *